US010957306B2

(12) United States Patent
Chen et al.

(10) Patent No.: US 10,957,306 B2
(45) Date of Patent: Mar. 23, 2021

(54) PREDICTING PERSONALITY TRAITS BASED ON TEXT-SPEECH HYBRID DATA

(71) Applicant: International Business Machines Corporation, Armonk, NY (US)

(72) Inventors: Yue Chen, Beijing (CN); Lin Luo, Beijing (CN); Qin Shi, Beijing (CN); Zhong Su, Beijing (CN); Changhua Sun, Beijing (CN); Enliang Xu, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 15/352,923

(22) Filed: Nov. 16, 2016

(65) Prior Publication Data

US 2018/0137432 A1 May 17, 2018

(51) Int. Cl.
*G10L 15/02* (2006.01)
*G10L 25/63* (2013.01)
*G10L 15/18* (2013.01)
*G06N 3/04* (2006.01)
*G06N 3/08* (2006.01)

(52) U.S. Cl.
CPC .......... *G10L 15/02* (2013.01); *G10L 15/1822* (2013.01); *G10L 25/63* (2013.01); *G06N 3/0445* (2013.01); *G06N 3/084* (2013.01)

(58) Field of Classification Search
CPC ..... G10L 15/02; G10L 15/1822; G10L 25/63; G06N 3/0445; G06N 3/084
See application file for complete search history.

(56) References Cited

U.S. PATENT DOCUMENTS

| 6,212,502 | B1 | 4/2001 | Ball et al. | |
|---|---|---|---|---|
| 8,271,902 | B1 * | 9/2012 | Mangini | H04M 1/72544 715/763 |
| 8,719,035 | B2 | 5/2014 | Stewart et al. | |
| 8,892,480 | B2 * | 11/2014 | Eustice | H04W 4/21 706/12 |
| 9,015,088 | B2 | 4/2015 | Shen et al. | |
| 9,047,165 | B1 * | 6/2015 | Mosterman | G06F 8/35 |
| 9,070,088 | B1 * | 6/2015 | Baveja | G06F 16/24578 |

(Continued)

OTHER PUBLICATIONS

Chin et al, "Evaluation Metrics for Inferring Personality from Text", Proceedings of the 24th ACM Conference on User Modeling, Adaptation and Personalisation (UMAP), 2016, 3 pages.

(Continued)

*Primary Examiner* — Alexey Shmatov
*Assistant Examiner* — Tri T Nguyen
(74) *Attorney, Agent, or Firm* — Amin, Turocy & Watson, LLP (57) ABSTRACT

Techniques for generating a personality trait model are described. According to an example, a system is provided that can generate text data and linguistic data, and apply psycholinguistic data to the text data and the linguistic data, resulting in updated text data and updated linguistic data. The system is further operable to combine the updated text data with the updated linguistic data to generate a personality trait model. In various embodiments, the personality trait model can be trained and updated as additional data is received from various inputs.

20 Claims, 5 Drawing Sheets

(56) References Cited

U.S. PATENT DOCUMENTS

| | | | | |
|---|---|---|---|---|
| 2006/0147889 A1* | 7/2006 | McDaniel | ................ | G09B 5/02 |
| | | | | 434/350 |
| 2007/0271098 A1* | 11/2007 | Stewart | ................... | G10L 17/26 |
| | | | | 704/257 |
| 2008/0033826 A1* | 2/2008 | Maislos | ................. | G06Q 30/00 |
| | | | | 705/14.66 |
| 2014/0032452 A1* | 1/2014 | Perkowitz | ............... | H04W 4/21 |
| | | | | 706/12 |
| 2014/0074920 A1* | 3/2014 | Nowak | ................. | G06Q 50/01 |
| | | | | 709/204 |
| 2014/0314225 A1* | 10/2014 | Riahi | ..................... | G06Q 30/02 |
| | | | | 379/265.09 |
| 2015/0127577 A1* | 5/2015 | Farronato | .......... | G06Q 30/0201 |
| | | | | 705/347 |
| 2015/0371663 A1* | 12/2015 | Gustafson | ............. | G10L 15/265 |
| | | | | 704/270.1 |
| 2015/0379888 A1* | 12/2015 | Hill | .......................... | G09B 7/06 |
| | | | | 434/236 |
| 2016/0098480 A1 | 4/2016 | Nowson | | |
| 2016/0300570 A1* | 10/2016 | Gustafson | ............... | G10L 25/51 |
| 2018/0075775 A1* | 3/2018 | Conway | ................... | G09B 7/00 |
| 2018/0294001 A1* | 10/2018 | Kayama | ................. | G10L 15/02 |

OTHER PUBLICATIONS

Golbeck et al, "Predicting Personality from Twitter", IEEE International Conference on Privacy, Security, Risk, and Trust, and IEEE International Conference on Social Computing, 2011, 8 pages.

Peng et al, "Predicting Personality Traits of Chinese Users Based on Facebook Wall Posts", Wireless and Optical Communication Conference (WOCC), 2015, IEEE, 6 pages.

* cited by examiner

PREDICTING PERSONALITY TRAITS BASED ON TEXT-SPEECH HYBRID DATA

BACKGROUND

The present invention generally relates to analysis of text-speech data and more specifically, to predicting personality traits based on text-speech hybrid data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to one embodiment, a computer-implemented method includes generating, by a device operatively coupled to a processor, text data associated with speech data; generating, tone data associated with the speech data; augmenting, the text data with psycholinguistic data to generate updated text data; and correlating, the tone data to the updated text data to generate text-speech hybrid data.

Other embodiments include a system and a computer program product.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The present invention includes embodiments directed to systems, computer program product, and/or computer-implemented methods.

Some embodiments of the present invention use text-speech hybrid data to generate a personality model.

As used herein, the term "text-speech" can be or include a combination of text data and speech data combined to generate text-speech hybrid data and/or a model associated with combining text data and speech data. In some embodiments, the text data can be correlated with associated speech data (e.g., using tone and/or emotion data as context for corresponding text data). In some embodiments, personality model generation can make use of text data, speech data, and psycholinguistic data.

Psycholinguistics is the study of the psychological and neurobiological factors that enable humans to acquire, use, comprehend and produce language. For instance, biology, neuroscience, cognitive science, linguistics, and information science analyze how the brain processes language, in addition to social sciences, human development, and communication theories. Psycholinguistics can make it possible to generate meaningful sentences out of vocabulary and grammatical structures. Psycholinguistics also makes it possible to understand utterances, words, text, etc. Other levels of linguistic structured analysis are possible including annotations, morphology, semantics and/or pragmatics.

In some embodiments, psycholinguistic data can be extracted from specific words and/or from specific sentences of provided speech data, etc. For example, tone and/or emotion can be associated with speech of extracted words and/or sentences, and correlated to text data and speech data. In some embodiments, psycholinguistic data (e.g., positive words, negative words, etc.) can be associated with hybrid features e.g., the word "family" can be associated with the word "happy," the word "family" can be associated with the word "worry," the word "money" can be associated with the word "angry," etc.).

In some embodiments, emotions such as anger and happiness can be associated with a faster speech tempo/rate and higher pitch speech, whereas an emotion such as sadness might be associated with a slower speech tempo/rate, and/or lower pitch speech.

Consequently, a predictive personality model, based on text-speech hybrid data, can be built to be predictive of personality traits.

Exemplary (non-limiting) applications of personality trait modeling include various business scenarios (e.g., call center, 911 emergency calls, service industry, etc.) where text data is not enough and might be skewed for a particular domain. Consequently, a call center representative can base a recommendation off a modeled personality trait.

In some embodiments, personality modeling is achieved by generating text data and linguistic data from speech data, applying psycholinguistic data to the text data—resulting in updated text data—and combining the updated text data and the speech data. In some embodiments linguistic data can be generated from any speech data, and text data can be generated from any speech data. In another example, the psycholinguistic data can also be applied to the speech data. In yet another example, social media data can also be added into the data analysis to generate a personality trait model.

Other exemplary (non-limiting) applications of personality trait modeling include the recommendation of products and/or services to a specific individual and/or group of individuals. By way of further example, the personality model can be used to improve marketing responses and conversation rates e.g., by leveraging a person's intrinsic personality traits to drive communication according to the intrinsic personality traits.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
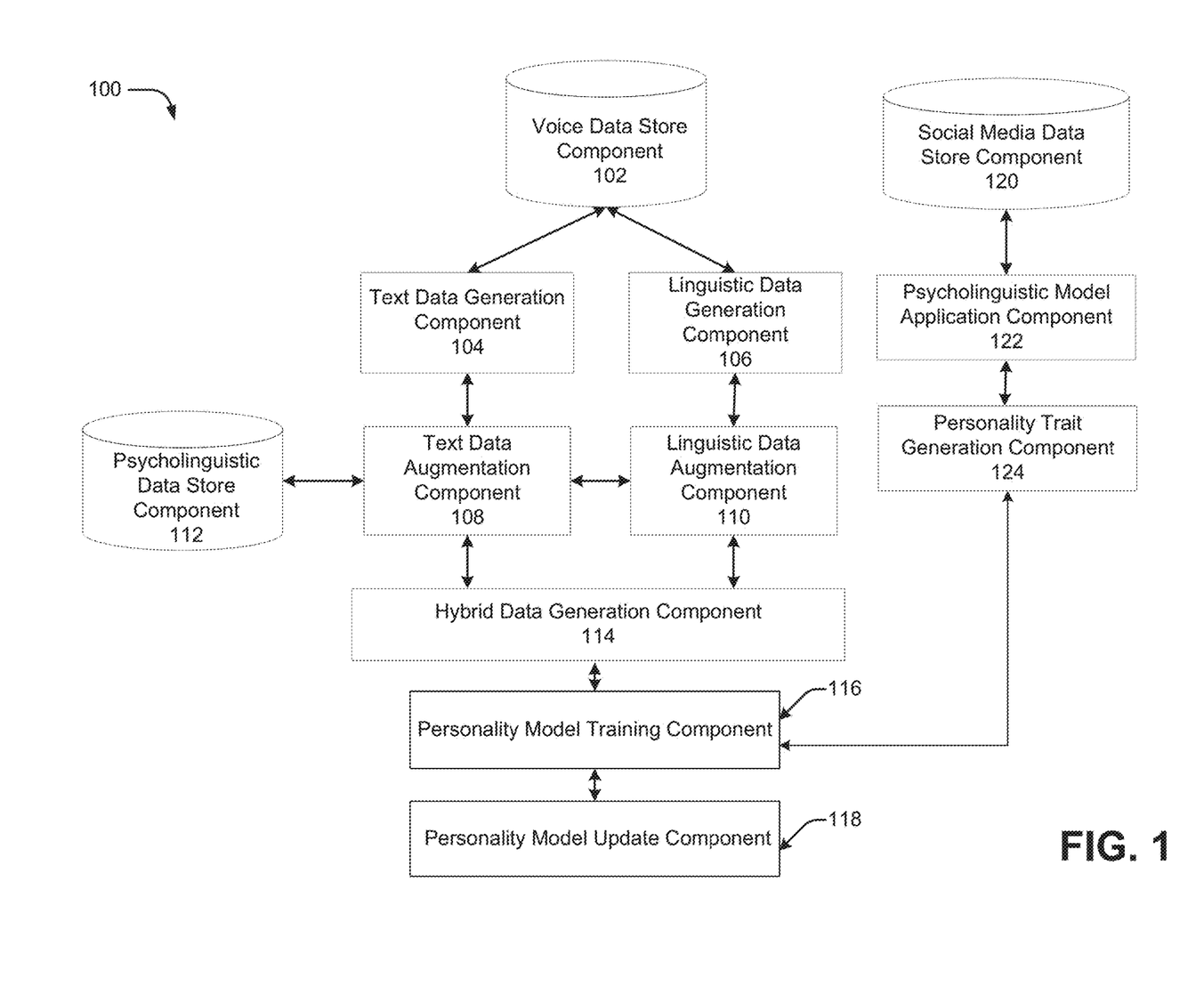
FIG. 1 illustrates a block diagram of an example, non-limiting system that can facilitate generation of a personality model in accordance with one or more embodiments of the present invention.

FIG. 1 illustrates a block diagram of an example, non-limiting system 100 that can facilitate generation of a personality model in accordance with one or more embodiments described herein.

As shown in FIG. 1, system 100 can comprise a voice data store component 102, which can receive speech data as an input. In various embodiments, the voice data store component 102 can receive speech as an input via a microphone, telephone, mobile device, video/audio recording device, etc. However, it should be appreciated that the voice data store component 102, can also accept various forms of text data and/or linguistic data. The voice data store component 102 can be located in any type of computing device that employs a processor. For example, the voice data store component 102 can be located on a server device provided in a data center having multiple servers (e.g., a single rack of servers to hundreds or thousands of servers) or a laptop computer. In other examples, the voice data store component 102 can be located in, but is not limited to: a desktop computer, a television, an Internet enabled television, a mobile phone, a smartphone, a tablet user computer (PC), a digital assistant (PDA), a heads up display (HUD), a virtual reality (VR) headset, an augmented reality (AR) headset, or another type of wearable computing device.

At text data generation component 104, the system 100 can extract voice data from the voice data store component 102. For example, the voice data store component 102 can receive a verbal input stating, "I am so excited about the concert," and then store the verbal input as voice data. The speech data ("I am so excited about the concert") can then be converted to text data representative of the speech at text data generation component 104. Consequently, any verbal input can be processed and converted to text data. Likewise, at linguistic data generation component 106, the speech data can be converted to linguistic data. The linguistic data can comprise various characteristics including, but not limited to: tempo, frequency, inflection, slurring, tone, tone resonance, pitch, etc. In this scenario, the verbal input indicates a feeling of excitement. Therefore, it is plausible that the linguistic data will indicate a high and/or elevated pitch associated with the statement, "I am so excited about the concert." It should be noted that although certain functions are performed at certain blocks, functions can be performed linearly and/or simultaneously. For example, although the extraction of the text data takes place in a different block than the extraction of the linguistic data, these two functions can either be performed linearly (e.g., extract text data and then extract linguistic data, or vice versa) or simultaneously where the text data and the linguistic data are extracted at the same time. It should also be noted that each component can communicate with an adjacent component in a bi-directional manner. For instance, after the text data generation component 104 has received text data from the voice data store component 102, the text data generation component 104 can send acknowledgement data representing an acknowledgement that it has received the voice data from the voice data store component 102. Other possible communication between components can include, but is not limited to, requests for data, acknowledgement of data receipt, indications that data is to be sent, etc.

At a text data augmentation component 108, psycholinguistic data from a psycholinguistic data store component 112 can be applied to the text data that was extracted at text data generation component 104. The psycholinguistic data store component 112 can comprise data related to various terms and how they are perceived. The psycholinguistic data store component 112 can also augment linguistic data provided by the linguistic data augmentation component 110. For instance, the word "family" can have a positive connotation for most persons, whereas the word "death" can have a negative connotation. By way of another example, a personality trait of an individual can be associated with the types of words he or she tends to use. For instance, an extrovert may use more nouns and/or pronouns (I, them, itself) than an introverted person. By way of yet another example, two different persons can say the same phrase and generate different linguistic data that gives rise to different personality traits. For example, when both person A and person B say, "the quality of the product is bad," the sentiment (based on the text alone) of both is generally understood as negative. However, the linguistic data associated with the text might result in an interpretation of the speech emotion of person A as "calm," whereas the speech emotion of person B might result in an interpretation of anger, which can be indicative of different personalities or personality traits.

Consequently, the psycholinguistic data store component 112 can augment the text data and/or the linguistic data. Further to the above example, the psycholinguistic data store component 112 can augment the text data and/or the linguistic data of the phrase "I am so excited about the concert." For example, with regards to the text data, the word "excited" is used therein, so it is a fair assessment to say that the person is excited. The word "I" is used, which may tend to indicate that the person is an extrovert, and the word "concert" is used. Additionally, the linguistic data might indicate a high and/or elevated pitch, indicating excitement. Therefore, the system 100 can indicate that the person is excited even without the text data indicating that the person is excited. Since concerts tend to comprise social functions and gatherings, it would be a fair assessment for the system 100 to associate (e.g., via the hybrid data generation component 114 that generates text-speech hybrid data) the phrase, "I am so excited about the concert," as belonging to a generally happy, extroverted, person who is very social.

In some implementations, the system 100 can comprise a personality model training component 116 based on the text-speech hybrid data from hybrid data generation component 114. Repetitive description of like elements employed in other embodiments described herein is omitted for sake of brevity.

At the personality model training component 116, the system 100 can train a text-speech personality model. Training can be based on a variety of factors. For instance, the training can receive other inputs that train the personality model including, but not limited to: global training data, profile training data, social media training data, etc. Training data can be specific to the particular person that the system 100 is analyzing. However, in a first instantiation, before the personality model has had the opportunity to be trained, all factors can be nominal or set to the standards of an average person using global training data. For instance, a person who typically states, "I am so excited about the concert," might say so with an elevated pitch and a fast pace because they are excited. Thus, an increase in pitch can be weighted heavily to determine excitement for the average individual. However, based on another individual's personality, the individual might say the same phrase with a normal pitch, as opposed to an elevated pitch. Consequently, although a baseline analysis (for the individual) of the pitch might not indicate excitement, the system 100 can infer excitement based on the term "excited" within the phrase, and provide a lower pitch threshold to indicate excitement for this particular individual, even if the word "excitement" is not used within other speech. Based on the previous phrase, the system 100 can also train the personality model to typically associate the word "sports" with excitement.

Based on the aforementioned assessments of excitement, the system 100 can recognize that the individual's pitch may not be a reliable factor for indicating excitement. Therefore, pitch can be weighted lower for the individual when it comes to assessing excitement. Conversely, the individual's pitch may change dramatically in stressful situations. For example, if the individual was asked a stressful question and responded, "I don't have an answer for you," the individual's heightened pitch might indicate that the individual is stressed. Therefore, in this situation, the individual's pitch can be weighted higher (than it is for excitement) with regards to assessing stressful situations for the individual. It should be understood that the more data the system 100 analyzes, the more precise the system 100 can become when training an individual's personality model.

At personality model update component 118, a new personality text-speech model can be generated and updated after each iteration of training at the personality model training component 116. However, it should be noted that the updates can take place automatically, manually, at pre-determined time periods, and/or at certain time intervals (1 hour, 1 day, 1 week, etc.). For instance, psycholinguistics may change as a person ages and becomes more mature. Therefore, the personality model update component 118 can update in accordance with psycholinguistic indicators that change as a function of time.

In some implementations, the system 100 can comprise a social media input from the social media data store component 120. Repetitive description of like elements employed in other embodiments described herein is omitted for sake of brevity.

The social media data store component 120 can comprise text, emoticons, and/or pictures associated with a social media profile (e.g., Twitter, Facebook, LinkedIn, etc.). A psycholinguistic model can also be applied to text data from the social media data store component 120. For example, the individual may have posted, "Rainy days are the worst" or "Rainy days=☹." Consequently, applying psycholinguistic data to the social media data at the psycholinguistic model application component 122 can generate additional personality trait model data that can be used to train the system 100. In this instance, the system 100 can associate a negative emotion with rain and/or rainy days based on the term "worst" and/or the emoticon "☹." In response to the psycholinguistic model being applied to the social media text data at the psycholinguistic model application component 122, the system 100 can generate personality trait data at the personality trait generation component 124. Thereafter, the generated personality trait data produced at the personality trait generation component 124 can be used as an input to the personality model training component 116 to train the text-speech personality model. Accordingly, the text-speech personality model can be built from social media data and voice data resulting in text data and linguistic data.

According to the system 100, in one or more embodiments, neural network language models can be constructed and trained as probabilistic classifiers that learn to predict a probability distribution, meaning that the system 100 can be trained to predict a probability distribution over the text data and linguistic data, given some psycholinguistic context. In another embodiment, this can be done using standard neural network training algorithms such as stochastic gradient descent with back propagation. The context can be a fixed size window of previous words, so that the network predicts from a feature vector representing the previous k words.

The system 100 can be employed to use hardware and/or software to solve problems that are highly technical in nature (e.g., word searches, semantic tagging, determination of term frequency, matching of disparate terms within corpora composed of millions of terms), that are not abstract and that cannot be performed as a set of mental acts by a human due to the processing capabilities needed to facilitate term mapping, for example. Further, some of the processes performed can be performed by a specialized computer for carrying out defined tasks related to memory operations.

By way of example and without limitation, system 100 can be associated with or included in: a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

By way of further example and without limitation, aspects of systems (e.g., system 100 and the like), product and/or processes in accordance with the present invention can be implemented as machine-executable component(s) embodied within machine(s). In other words, machine-executable component(s) can be embodied in one or more computer readable mediums (or media) associated with one or more machines. As will be described in more detail below, such component(s), when executed by the one or more machines, e.g., computer(s), computing device(s), virtual machine(s), etc. can cause the machine(s) to perform the corresponding aspects of the operations.

Figure 2:
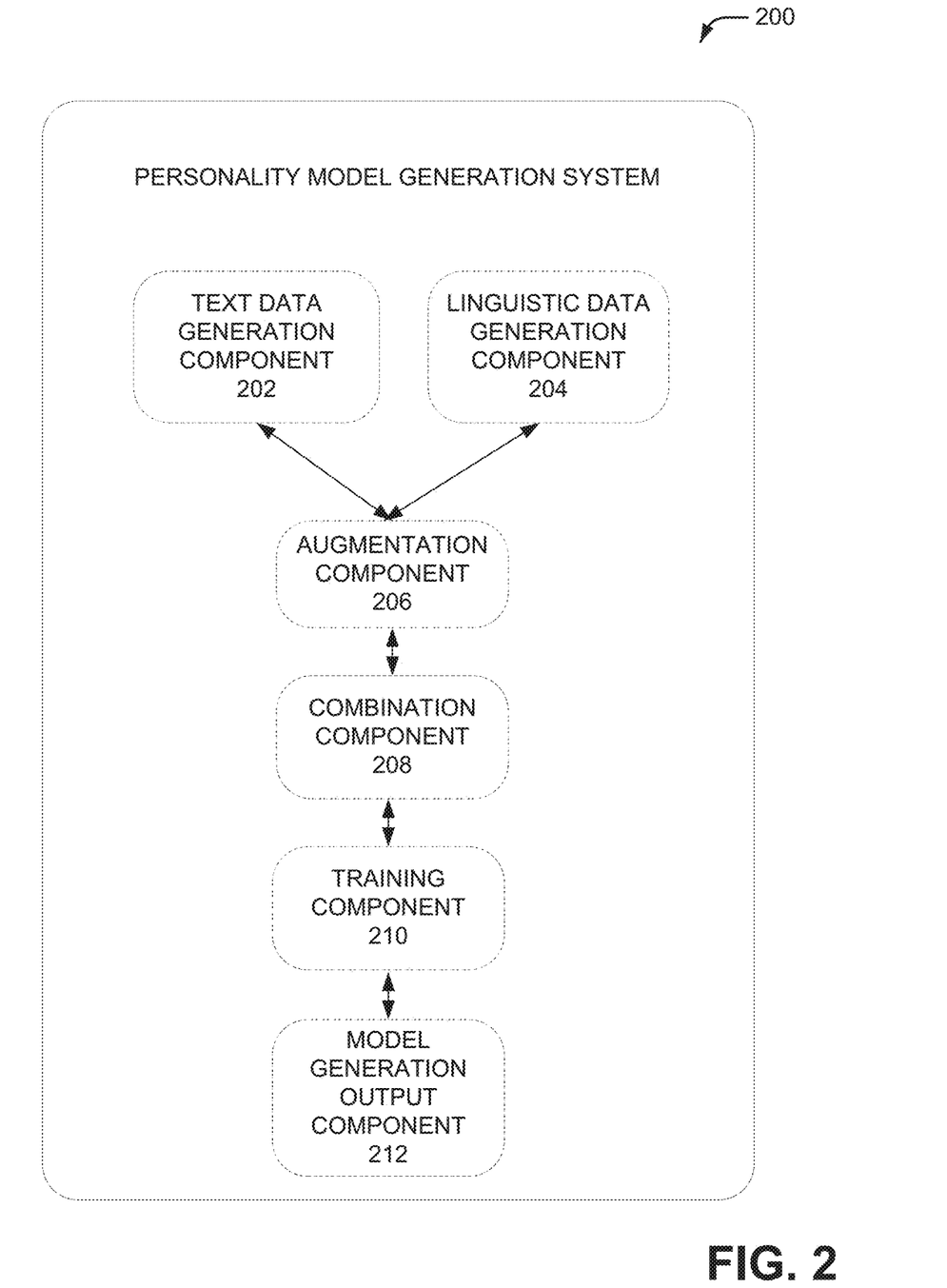
FIG. 2 illustrates an example, non-limiting personality model generation component in accordance with one or more embodiments of the present invention.

FIG. 2 illustrates an example personality model generation component 200 in accordance with one or more embodiments described herein. Repetitive description of like elements employed in other embodiments described herein is omitted for sake of brevity.

In the embodiment shown in FIG. 2, the system 100 can include a personality model generation component 200. The personality model generation component can comprise several sub-components, which can be electrically and/or communicatively coupled to one another in various embodiments. As shown in FIG. 2, the text data generation component 202 can be communicatively coupled to the augmentation component 206. The text data generation component 202, can generate text data from inputs received from the voice data store component 102. For example, the voice data store component 102 can receive a verbal input stating, "I am so excited about the concert," and then store the verbal input as voice data. The speech data ("I am so excited about the concert") can then be converted to text data representative of the speech by the text data generation component 202. Consequently, the verbal input is processed and converted to text data by the text data generation component 202.

Likewise, the linguistic data generation component 204 can generate linguistic speech data from inputs received from the voice data store component 102. The linguistic data generation component 204 can also be communicatively coupled to the augmentation component 206. It should also be noted that, in additional embodiments, the text data generation component 202 and the linguistic data generation component 204 can be communicatively coupled to each other. The linguistic data can comprise various speech characteristics including, but not limited to: tempo, frequency, inflection, slurring, tone, tone resonance, pitch, etc. In this scenario, the verbal input indicates a feeling of excitement. Therefore, it is plausible that the linguistic data will indicate a high and/or elevated pitch associated with the statement, "I am so excited about the concert."

The augmentation component 206 can augment the text data and the linguistic data by applying psycholinguistic data. The psycholinguistic data can comprise data related to various terms and how they are perceived. For instance, the word "family" can have a positive connotation for most persons, whereas the word "death" can have a negative connotation for most persons. Alternatively, an individual's social status can be associated with the types of words he or she tends to use. For instance, an extrovert may use more nouns and/or pronouns (I, them, itself) than an introverted person. Additionally, two different persons can say the same phrase and generate different linguistic data giving rise to two different personality traits. For example, when both person A and person B say, "the quality of the product is bad," the sentiment can be negative. However, the speech emotion of A can be calm, whereas the speech emotion of B can be angry, both of which can be indicative of personality or a personality trait.

Consequently, applying psycholinguistic data to the text data and/or the linguistic data can augment this type of analysis. In keeping aligned with the previous example, the psycholinguistic data can augment the text data and/or the linguistic data of the phrase "I am so excited about the concert." For example, with regards to the text data, the word "excited" is used therein, so it is a fair assessment to say that the person is excited. The word "I" is used, which can indicate that the person is an extrovert, and the word "concert" is used. Additionally, the linguistic data might indicate a high and/or elevated pitch indicating excitement. Therefore, the system can indicate that the person is excited even without the text data indicating that the person is excited. Since concerts tend to comprise social functions and gatherings, it would be a fair assessment for the personality model generation component 200 to associate the phrase, "I am so excited about the concert" as belonging to a generally happy, extroverted, person who is very social.

A combination component 208 can combine the augmented text data and the augmented linguistic data to be used as model personality trait data. It should be noted that the combination component 208 can combine all augmented text data with the augmented linguistic data, or the combination component 208 can partition the augmented text data with the augmented linguistic data and combine the partitioned data. Combining the partitioned data can be based on a user preference and/or a priority of augmented text data use or augmented linguistic data use. For example, if the user would like to rely more heavily on the augmented linguistic data than the augmented text data, then the augmented linguistic data can be weighted more heavily than the augmented text data resulting in a higher number of partitioned linguistic data for combination with a lower of number of partitioned text data.

Unsupervised and/or supervised learning can stem from an association of frequent terms, which are commonly used by the individual. In some embodiments, a process can use a neural network in an unsupervised manner to map words from the social media data store component 120 to a psycholinguistic analysis. Additionally, emotions can be mapped to words based on a psycholinguistic analysis and weighted accordingly. For example, if a user's use of the word "family" is generally associated with a positive emotion nine out of ten times, then the personality model generation component 200 can associate a positive emotion with the word family. However the personality model generation component 200 can be dynamic in that, over time, a person's use of the word "family" may become associated with a negative emotion. Consequently, the personality model generation component 200 can account for this by gradually changing the emotion associated with the word "family."

The training component 210 can be communicatively coupled to the combination component 208. The training component 210 can be used to train the system 100 based on variances in data over time. For instance, new text data and new linguistic data can prompt new augmentation procedures resulting in newly augmented text data and/or newly augmented linguistic data. The newly augmented text data and/or the newly augmented linguistic data can be reconciled with the previously augmented text data and/or the previously augmented linguistic data to train the system 100 at the training component 210.

A memory and a processor can comprise functionality with regard to the training component 210. The disclosed aspects in connection with the personality model generation component 200 can employ various artificial intelligence (AI)-based schemes for carrying out various aspects thereof. For example, a process for detecting one or more trigger events such as the augmentation process, text data generation, or linguistic data generation, and modifying one or more reported data measurements, and so forth, can be facilitated with an example automatic classifier system and process. In another example, a process for penalizing the text data while preferring the linguistic data can be facilitated with an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical based analysis (e.g., factoring into the analysis psycholinguistic data) to prognose or infer an action that can be automatically performed. In the case of the personality model generation component, for example, attributes can be a frequency of use and a tone and the classes can be an emotion or emotion value related to an emotion.

A support vector machine (SVM) is an example of a classifier that can be employed. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop personality trait models.

The disclosed aspects can employ classifiers that are explicitly trained (e.g., via a generic training data) as well as implicitly trained (e.g., via observing mobile device social media usage as it relates to triggering event, receiving extrinsic information, and so on). For example, SVMs can be configured via a learning or training phase within a classifier constructor and a selection module. Thus, the classifier(s) can be used to automatically learn and perform a number of functions, including but not limited to modifying text data, modifying linguistic data, and so forth. The criteria can include, but is not limited to, predefined values, and/or attenuation tables or other parameters, and so on.

The personality model generation component 200, which can also comprise a personality model generation output component 212. The personality model generation output component 212 can be communicatively coupled to the training component 210. The personality model generation output component 212 can output the personality model in a variety of different forms. For instance, the personality model generation output component 212 can comprise a graphic user interface (GUI) that can display the personality model. The display can show a history of the personality model over time. For instance, previous personality models associated with past dates can converge to show how the current personality model is different or similar to the previous personality models.

In another embodiment, the personality model can also be output via an audible signal to a call center representative or the like. Consequently, the call center representative can be provided with an audible signal that indicates a personality trait associated with a user of the system 100. For instance, one beep might indicate a generally happy personality, while five beeps might indicate a hostile personality. It should be noted that any audible configuration is possible and can be preemptively designated by the user and/or the call center representative.

Figure 3:
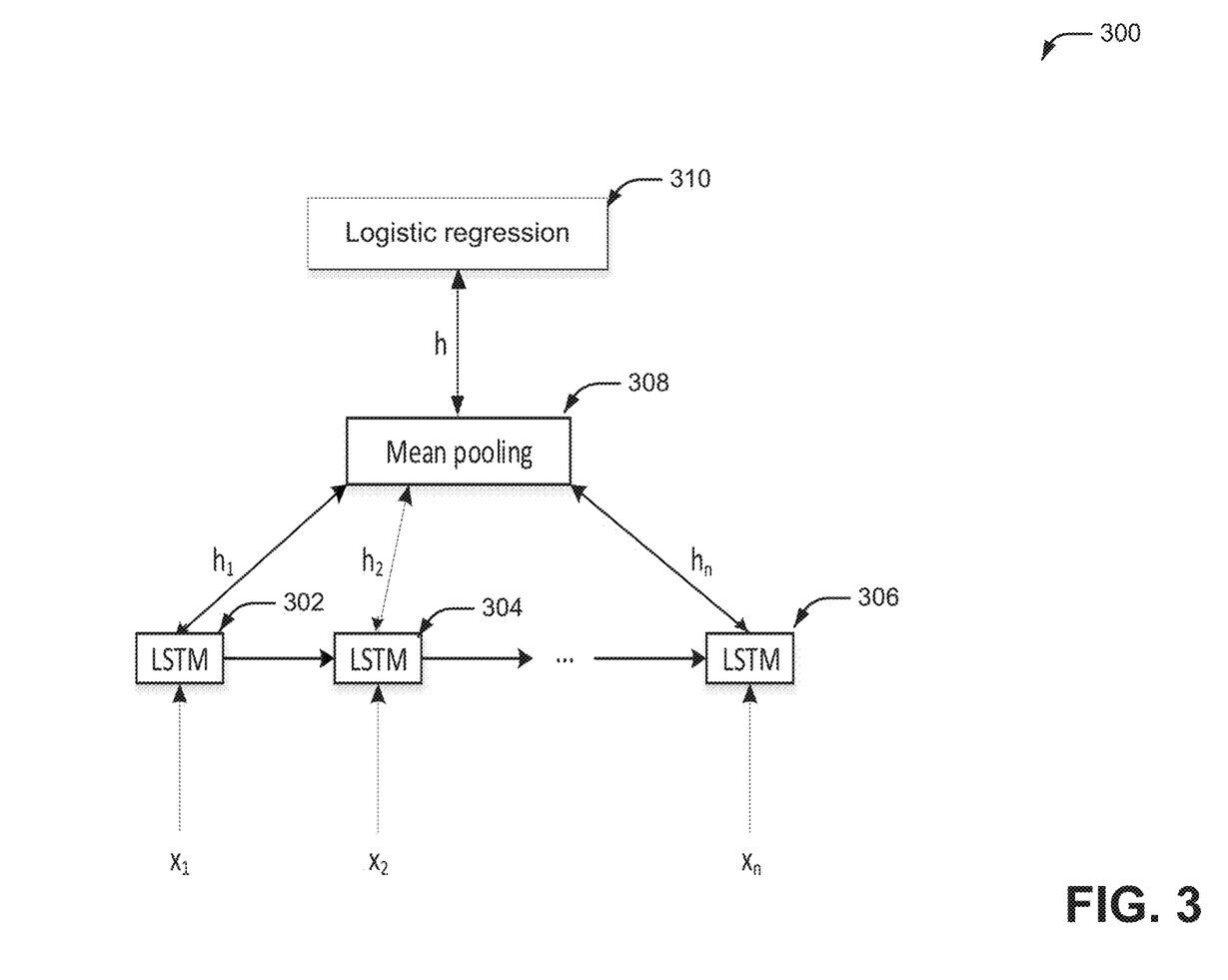
FIG. 3 illustrates an example, non-limiting logistic regression model that can facilitate personality trait modeling in accordance with the personality model generation component in accordance with one or more embodiments of the present invention.

FIG. 3 illustrates an example non-limiting logistic regression model that can facilitate personality trait modeling in accordance with the personality model generation component in accordance with one or more embodiments described herein. Repetitive description of like elements employed in other embodiments described herein is omitted for sake of brevity.

In the embodiment shown in FIG. 3, the personality model generation component 200 can include a neural network 300. It should be noted that other neural networks can be used in conjunction with the present invention including, but not limited to: recursive neural networks, recurrent neural networks, Hopfield networks, etc. As depicted the neural network 700 can comprise a long short-term memory (LSTM) function 302, 304, 306, a mean pooling function 708, and a logistic regression function 310. The LSTM function 302, 304, 306 can learn (be trained) to classify, process, and predict time series from experience regarding inputs $x_1 x_2 \ldots x_n$. The LSTM can also be trained by the aforementioned artificial intelligence processes of FIG. 2.

In some embodiments, affinity scores can be computed and aggregated across input and output term data and linguistic data. For example, a Bayesian generation model can be used, where one or more input terms generate an output term with a probability as a function of a score. An overall score can be generated based on a function of a likelihood of an output given the inputs $h(x_1 x_2 \ldots x_n)$ where $x_1 x_2 \ldots x_n$ can be a collection of personality model data from previous personality models. The data h output by the LSTM function 302, 304, 306 can then be pooled by the mean pooling function 308. The mean pooling function 308 can pool the data h for later use rather than acquire on an on-demand basis. For instance, if the logistic regression function 310 requests a resource h from the mean pool, then when the logistic regression function 310 is done with the resource h, the resource h can be returned to the mean pool rather than released and lost.

Therefore, when psycholinguistic data is needed, the system 300 can pull from a mean pool associated with the mean pooling function 308 rather than request new data. The logistic regression function 310 can measure the relationship between a categorical dependent variable and one or more independent variables by estimating probabilities using a logistic function. For instance, the logistic regression function can estimate the probability that the word "family" is associated with a positive emotion of a user, or that the word "money" is associated with a negative emotion of the user. Therefore, at any given time, the logistic regression function 310 can request and process data from the mean pool to help train the system 300. For example, given psycholinguistic data of length m, a probability $P(w_1, \ldots, w_m)$ can be assigned, wherein $w_1$ can represent the probability that a word is associated with a specific emotion. The ability for system 100 to estimate the relative likelihood of different combinations of words to emotions can be employed in many natural language processing applications including, but not limited to, speech recognition, machine translation, part of speech (POS) tagging, parsing, handwriting recognition, information retrieval and other applications.

Figure 4:
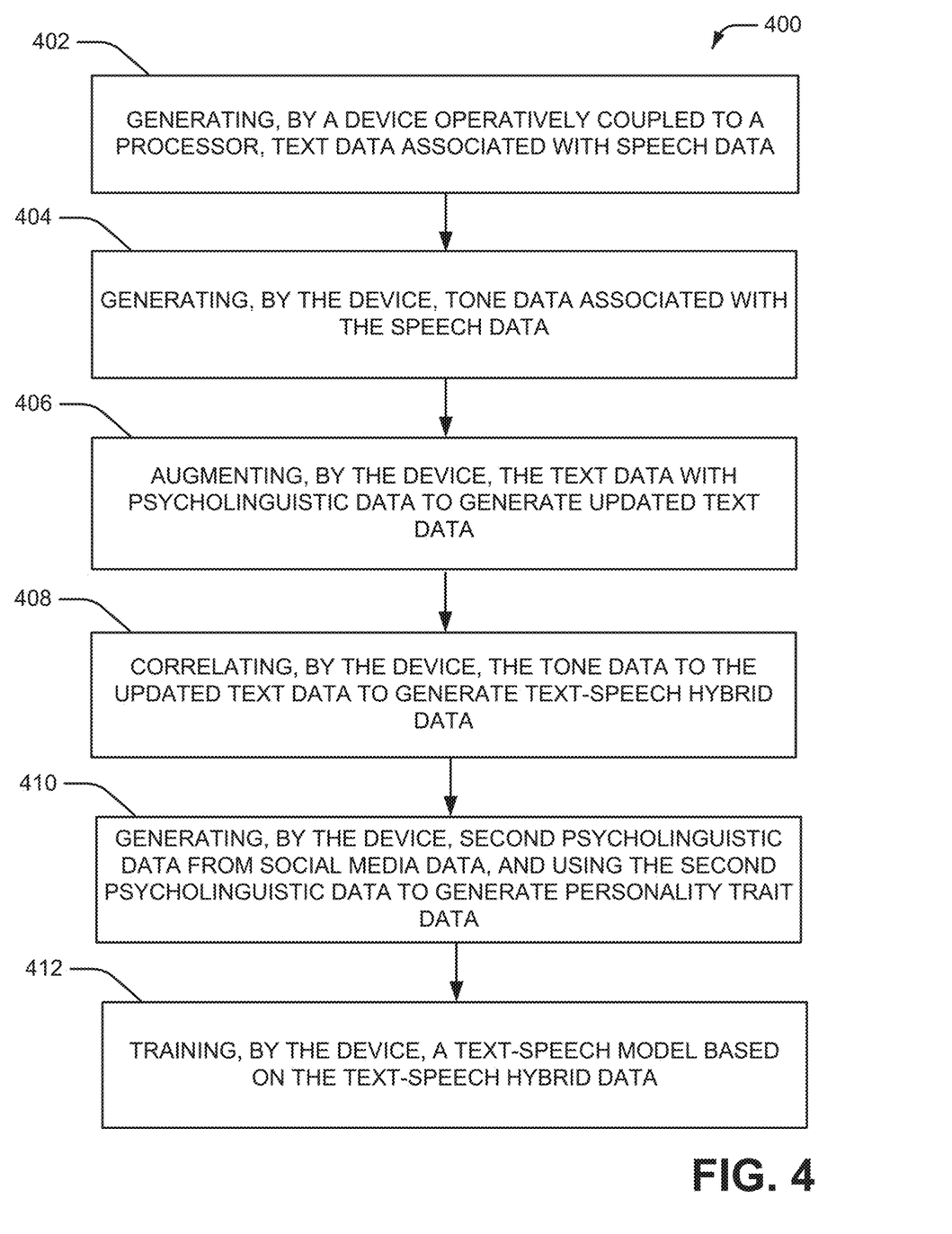
FIG. 4 illustrates a flow diagram of an example, non-limiting computer-implemented method that facilitates personality trait modeling in accordance with one or more embodiments of the present invention.

FIG. 4 illustrates a flow diagram of yet another example, non-limiting computer-implemented method that facilitates personality trait modeling in accordance with one or more embodiments described herein. Repetitive description of like elements employed in other embodiments described herein is omitted for sake of brevity.

In some implementations, the model generation flow diagram 400 can generate text data associated with speech data (e.g., via the text data generation component 202) at element 402. The text data can be in accordance with any speech data that has been communicated to the model generation flow diagram 400 via an input and/or a voice data store. It should be appreciated that the speech data can be verbal and/or a recording of previously spoken speech. The model generation flow diagram 400 can also generate tone data associated with the speech data (e.g., via the text data generation component 202) at element 404. The tone data can comprise linguistic intonation data associated with the tone of the speech data.

The text data can be augmented with psycholinguistic data (e.g., via the augmentation component 206), to generate updated text data at element 406. It should be noted that the augmentation component 406 can augment various sets of data in parallel or linearly depending upon inputs into the system 100. The augmentation component 206 can overlay the text data with psycholinguistic data to generate the updated text data. Additionally, the model generation flow diagram 400 can correlate (e.g., via the combination component 208) the tone data to the updated text data to generate text-speech hybrid data at element 408.

Social media data can also be input into the model generation flow diagram 400 for additional modeling purposes. Pictures, emoticons, posts, etc. can be used to associate linguistics with emotions thereby providing an additional layer of context for analysis. For instance, second psycholinguistic data can be generated from social media data and used to generate additional personality trait data. The model generation flow diagram 400 can also generate second psycholinguistic data at element 410 from the social media data. The social media data can be stored in the social media data store component 120 and have a psycholinguistic model applied to the social media data. The psycholinguistic model can be applied by the augmentation component 206 or another augmentation component associated with the social media data store component 120. Thus, additional personality traits can be generated from the social media data external to the voice data. The personality trait data can then be used to train a text-speech model based on the text-speech hybrid data (e.g., via the training component 210) at element 412. The training can take place at predetermined times and/or when a certain amount of data has been collected for processing. Consequently, the personality model can be output by the model generation component 200 for use in a variety of applications such as call service centers, 911 call centers, etc.

Figure 5:
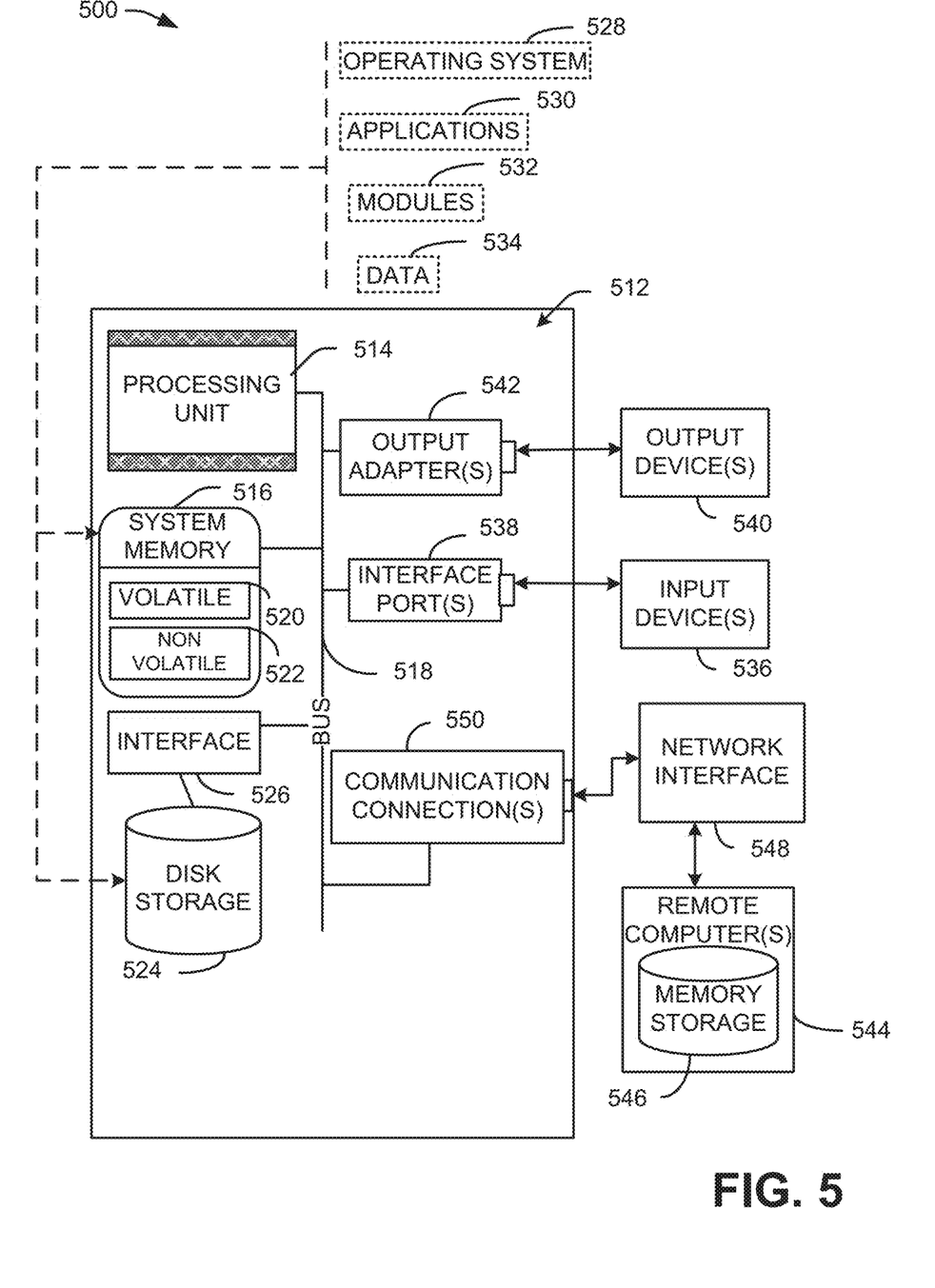
FIG. 5 illustrates a block diagram of an example, non-limiting operating environment in accordance with one or more embodiments of the present invention.

In order to provide a context for the various aspects of the disclosed subject matter, FIG. 5 as well as the following discussion is intended to provide a general description of a suitable environment in which the various aspects of the disclosed subject matter can be implemented. FIG. 5 illustrates a block diagram of an example, non-limiting operating environment in which one or more embodiments described herein can be facilitated. With reference to FIG. 5, a suitable operating environment 500 for implementing various aspects of the present invention can also include a computer 512 configured to generate a personality model via the system 100. The computer 512 can also include a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514. The system bus 518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 516 can also include volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 512 can also include removable/non-removable, volatile/non-volatile computer storage media. FIG. 5 illustrates, for example, a disk storage 524. Disk storage 524 can also include, but is not limited to, devices like a magnetic disk drive, floppy disk drive, tape drive, Jaz drive, Zip drive, LS-100 drive, flash memory card, or memory stick. The disk storage 524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 524 to the system bus 518, a removable or non-removable interface is typically used, such as interface 526. FIG. 5 also depicts software that acts as an intermediary between users and the basic computer resources described in the suitable operating environment 500. Such software can also include, for example, an operating system 528. Operating system 528, which can be stored on disk storage 524, acts to control and allocate resources of the computer 512.

System applications 530 take advantage of the management of resources by operating system 528 through program modules 532 and program data 534, e.g., stored either in system memory 516 or on disk storage 524. The system applications 530 can be configured to generate a personality model via the system 100. It is to be appreciated that the present invention can be implemented with various operating systems or combinations of operating systems. A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port can be used to provide input to computer 512, and to output information from computer 512 to an output device 540. Output adapter 542 is provided to illustrate that there are some output devices 540 like monitors, speakers, and printers, among other output devices 540, which require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a computer, a server, a router, a network PC, a workstation, a microprocessor based appliance, a peer device or other common network node and the like, and typically can also include many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 550 refers to the hardware/software employed to connect the network interface 548 to the system bus 518. While communication connection 550 is shown for illustrative clarity inside computer 512, it can also be external to computer 512. The hardware/software for connection to the network interface 548 can also include, for exemplary purposes only, internal and external technologies such as, modems including regular telephone grade modems, cable modems and DSL modems, ISDN adapters, and Ethernet cards.

One or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that the present invention also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of the present invention can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In the present invention, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program product and computer-implemented methods. It is, of course, not possible to describe every conceivable combination thereof for purposes of describing the present invention, but one of ordinary skill in the art can recognize that many further combinations and permutations of the present invention are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating, by a device operatively coupled to a processor, text data representative of speech data from verbal input of a user;
    generating, by the device, tone data comprising linguistic characteristics of a voice of the user in voice data from the verbal input of the user;
    augmenting, by the device, the text data with psycholinguistic data to generate updated text data;
    correlating, by the device, the tone data to the updated text data;
    combining, by the device, the tone data with the updated text data according to respective defined weights for the tone data and the updated text data to generate text-speech hybrid data, wherein the combining comprises:
        partitioning the updated text data and the tone data, and
        combining the partitioned updated text data and tone data resulting in the text-speech hybrid data comprising different amounts of the updated text data and the tone data according to the respective defined weights;
    generating, by the device, a personality model based on the text-speech hybrid data, wherein the personality model employs the text-speech hybrid data in determining at least one personality trait of the user; and
    training, by the device, the personality model based on the text-speech hybrid data.

2. The computer-implemented method of claim 1, wherein the psycholinguistic data comprises first psycholinguistic data, the computer-implemented method further comprising:
    generating, by the device, second psycholinguistic data from social media data; and
    using, by the device, the second psycholinguistic data to generate personality trait data.

3. The computer-implemented method of claim 1, further comprising:
    identifying, by the device, emotion data related to an emotion from the tone data.

4. The computer-implemented method of claim 1, wherein the generating the text data comprises generating the text data as a word.

5. The computer-implemented method of claim 1, wherein the respective defined weights are determined based on:
    analyzing the tone data and the updated text data;
    determining a reliability of the tone data as a factor for determining the at least one personality trait;
    determining the respective defined weights based on the reliability.

6. The computer-implemented method of claim 1, wherein the respective defined weights are based on a user preference.

7. The computer-implemented method of claim 1, further comprising:
    generating, by the device, and based on the personality model, a recommendation associated with a service.

8. A system, comprising:
    a memory that stores computer executable components; and
    a processor operably coupled to the memory and that executes the computer executable components stored in the memory, wherein the computer executable components comprise:
        a text data generation component that generates text data representative of speech data from verbal input of a user;
        a linguistic data generation component that generates linguistic data comprising characteristics of a voice of the user in voice data from the verbal input of the user;
        an augmentation component that applies psycholinguistic data to the text data, resulting in augmented text data;
        a combination component that combines the linguistic data with the augmented text data according to respective defined weights for the linguistic data and the augmented text data to generate text-speech hybrid data, wherein the combining comprises:
            partition the augmented text data and the linguistic data, and
            combine the partitioned augmented text data and linguistic data resulting in the text-speech hybrid data comprising different amounts of the augmented text data and the linguistic data according to the respective defined weights;
        a model generation output component that generates a personality model based on the text-speech hybrid data, wherein the personality model employs the text-speech hybrid data in determining at least one personality trait of the user; and
        a training component that trains the personality model based on the text-speech hybrid data.

9. The system of claim 8, wherein the respective defined weights are based on respective priorities associated with the linguistic data and the augmented text data.

10. The system of claim 8, wherein personality trait data to be received by the training component is selected from the group consisting of data based on a social media profile, and social media data from a personality trait generation component.

11. The system of claim 8, wherein the model generation output component displays a history of changes over time to the personality model representative of a specified user.

12. The system of claim 8, wherein the linguistic data is selected from the group consisting of voice intonation data, voice inflection data, and voice frequency data.

13. The system of claim 8, wherein the personality model generates a recommendation associated with a service.

14. The system of claim 8, wherein the model generation output component identifies emotion data related to an emoticon from the text data.

15. A computer program product for generating a personality model, the computer program product comprising a computer readable storage medium having program instructions embodied therewith, the program instructions executable by a device to cause the device to:

generate text data representative of speech data from verbal input of a user;

generate linguistic data comprising characteristics of a voice of the user in voice data from the verbal input of the user;

augment the text data with first psycholinguistic data, resulting in augmented text data;

combine the linguistic data with the augmented text data according to respective defined weights for the linguistic data and the augmented text data to generate text-speech hybrid data associated with the personality model, wherein the combining comprises:

partition the augmented text data and the linguistic data, and combine the partitioned augmented text data and linguistic data resulting in the text-speech hybrid data comprising different amounts of the augmented text data and the linguistic data according to the respective defined weights;

generate the personality model based on the text-speech hybrid data, wherein the personality model employs the text-speech hybrid data in determining at least one personality trait of the user; and train the personality model based on the text-speech hybrid data.

16. The computer program product of claim 15, wherein the program instructions are further executable by the device to cause the device to:

based on social media data, train the personality model, wherein the social media data comprises second psycholinguistic data associated with a user profile.

17. The computer program product of claim 15, wherein the program instructions are further executable by the device to cause the device to:

correlate the text data to the linguistic data, resulting in correlated data.

18. The computer program product of claim 17, wherein the program instructions are further executable by the device to cause the device to:

display the personality model in accordance with a request for the personality model.

19. The computer program product of claim 15, wherein the program instructions are further executable by the device to cause the device to:

display a history of changes over time to the personality model representative of a specified user.

20. The computer program product of claim 15, wherein the linguistic data is selected from the group consisting of voice intonation data, voice inflection data, and voice frequency data.

* * * * *